US008369216B2

(12) United States Patent
Kan

(10) Patent No.: US 8,369,216 B2
(45) Date of Patent: Feb. 5, 2013

(54) SYSTEM AND METHOD OF MONITORING PACKETS IN FLIGHT FOR OPTIMIZING PACKET TRAFFIC IN A NETWORK

(75) Inventor: Daniel D. Kan, San Jose, CA (US)

(73) Assignee: Silver Spring Networks, Inc., Redwood City, CA (US)

(*) Notice: Subject to any disclaimer, the term of this patent is extended or adjusted under 35 U.S.C. 154(b) by 301 days.

(21) Appl. No.: 12/907,047

(22) Filed: Oct. 19, 2010

(65) Prior Publication Data
US 2012/0092993 A1    Apr. 19, 2012

(51) Int. Cl.
*G01R 31/08*    (2006.01)

(52) U.S. Cl. ........................ 370/231; 370/235

(58) Field of Classification Search ........... 370/231–235
See application file for complete search history.

(56) References Cited

U.S. PATENT DOCUMENTS

| | | | |
|---|---|---|---|
| 5,781,801 A * | 7/1998 | Flanagan et al. | 710/56 |
| 2004/0015591 A1 * | 1/2004 | Wang | 709/228 |
| 2008/0225705 A1 * | 9/2008 | Janarthanan et al. | 370/230 |
| 2010/0172348 A1 | 7/2010 | Saito et al. | |
| 2010/0195495 A1 | 8/2010 | Yeung et al. | |
| 2010/0214922 A1 | 8/2010 | Yeung et al. | |

OTHER PUBLICATIONS

Notification of Transmittal of the International Search Report (Forms PCT/ISA/220 and PCT/ISA 210) and the Written Opinion of the International Searching Authority (Form PCT/ISA/237) issued on Apr. 18, 2012, in the corresponding International Application No. PCT/US2011/055592. (10 pages).

\* cited by examiner

*Primary Examiner* — Jianye Wu
*Assistant Examiner* — Wanda Z Russell
(74) *Attorney, Agent, or Firm* — Buchanan Ingersoll & Rooney PC

(57) ABSTRACT

Systems and methods of optimizing packet flow in a network are disclosed. An internetwork has a first network and plural second networks. A respective packet-in-flight counter is established for each one of the plural second networks and a respective maximum packet-in-flight indication for each one of the plural second networks. The respective packet-in-flight counter for each one of the plural second networks when a request packet is sent from any node in the first network to any node in that one of the plural second networks, or a response packet is received from any node that one of the plural second networks. it is determined whether a second request packet can be sent from any node in the first network to any of the plurality of nodes in one of the plural second networks, based on processing a value of the respective packet-in-flight counter for that one of the plural second networks and a value of the respective maximum packet-in-flight indication for that one of the plural second networks. The respective maximum packet-in-flight indication for each one of the plural second networks is adjusted based on a statistic that is indicative of roundtrip time for request packets sent from any node of the first network to any of the plurality of nodes in that one of the plural second networks.

26 Claims, 13 Drawing Sheets

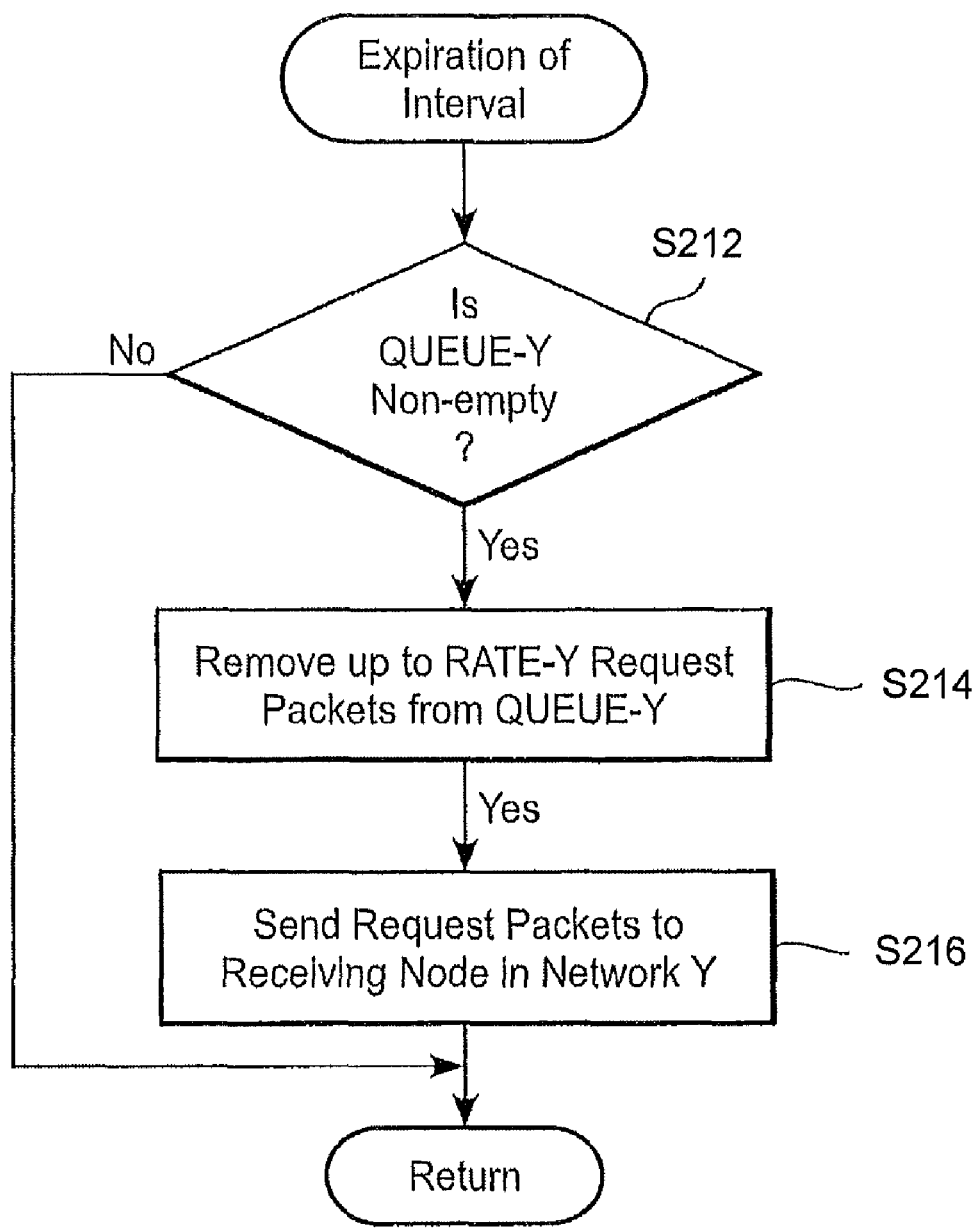

QUEUE-B, PIF-LIMIT-B = 3, PIF-COUNTER-B = 0

| RP:B1 | RP:B2 | RP:B3 | RP:B4 |

QUEUE-C, PIF-LIMIT-C = 1, PIF-COUNTER-C = 0

| RP:C4 | RP:C2 | RP:C1 | RP:C3 |

QUEUE-D, PIF-LIMIT-D = 2, PIF-COUNTER-D = 0

| RP:D2 | RP:D3 | RP:D1 | RP:D4 |

FIG. 4A

QUEUE-B, PIF-LIMIT-B = 3, PIF-COUNTER-B = 3

| RP:B1 |

QUEUE-C, PIF-LIMIT-C = 1, PIF-COUNTER-C = 1

| RP:C4 | RP:C2 | RP:C1 |

QUEUE-D, PIF-LIMIT-D = 2, PIF-COUNTER-D = 2

| RP:D2 | RP:D3 |

FIG. 4B

QUEUE-B, PIF-LIMIT-B = 3, PIF-COUNTER-B = 3

| RP:B1 |

QUEUE-C, PIF-LIMIT-C = 1, PIF-COUNTER-C = 0

| RP:C4 | RP:C2 | RP:C1 |

QUEUE-D, PIF-LIMIT-D = 2, PIF-COUNTER-D = 2

| RP:D2 | RP:D3 |

FIG. 4C

QUEUE-B, PIF-LIMIT-B = 3, PIF-COUNTER-B = 3

| RP:B1 |

QUEUE-C, PIF-LIMIT-C = 1, PIF-COUNTER-C = 1

| RP:C4 | RP:C2 |

QUEUE-D, PIF-LIMIT-D = 2, PIF-COUNTER-D = 2

| RP:D2 | RP:D3 |

FIG. 4D

# SYSTEM AND METHOD OF MONITORING PACKETS IN FLIGHT FOR OPTIMIZING PACKET TRAFFIC IN A NETWORK

RELATED APPLICATIONS

The present patent application is related to U.S. patent application Ser. No. 12/320,823 (pending, and published on Aug. 5, 2010 as United States Patent Application Publication 20100195495) and U.S. patent application Ser. No. 12/379,490 (pending, and published on Aug. 26, 2010 as United States Patent Application Publication 20100214922), each of which is incorporated by reference herein in its entirety.

FIELD

The disclosed systems and methods are generally directed to communication and data interchange between nodes in a computer network or internetwork, particularly Internet Protocol based networks and internetworks. The exemplary embodiments are particularly aimed at the efficient and economical transmission of data between computer nodes.

BACKGROUND

An internetwork is a collection of distinct computer networks connected using a common routing technology. The "Internet" is an example of such an internetwork, where communication between nodes in distinct networks is facilitated by an internetworking protocol standard, the Internet Protocol (IP) Suite.

The proper noun "Internet" (capitalized) refers to a global, publicly accessible system of interconnected packet switched networks that interchange data using the Internet Protocol Suite.

Internetworks which are not the "Internet" but which use the Internet Protocol Suite are sometimes referred to variously as an "internet", "IP internetwork", "private internet", "private IP internetwork" or "private IP network". That is to say, that the "Internet" is merely one example of an IP based internetwork, although it is a very popular one owing to its global and publicly accessible nature.

As is generally known in IP networks, in order for a node in an IP internetwork to send data to another node on the IP internetwork, the data must be encapsulated within an IP packet.

FIG. 1A is a block diagram of a computer network consistent with the prior art. As shown in FIG. 1A, Node 1, Node 2, Node 3 and Node 4 are all connected to a computer network 10. For data interchange to occur between networks, an internetwork is formed. The formation of an internetwork depends on the use of certain nodes, which are distinguished as gateway nodes that interconnect the networks. These interconnecting nodes may include, for example, "routers."

FIG. 1B is a block diagram of an internetwork consistent with the prior art. As shown in FIG. 1B, the internetwork 20 includes a Network A, a Network B, a Network C, and a Network D. Each of these networks includes a special node that is distinguished by a circle. In FIG. 1B, the special nodes Node A, Node B, Node C, and Node D, are routers (but may be any of various types of nodes that interconnect two or more networks), and will hereafter be designated Router A, Router B, Router C, and Router D, respectively.

In one example, if Node C3 of Network C sends a packet to Node A1 of Network A, the packet must first be sent to Router C of Network C. Router C in turn, sends the packet to Router B of Network B. From Router B, the packet is sent to Router A of Network Router A, which delivers the packet to Node A1 of Network A. The nomenclature for how a packet is routed from one node to another between networks is often referred to as the "path" between nodes. Each element of a path is variously referred to as an "intermediary node," an "intermediate node," or more simply a "hop."

Paths between nodes and routers can be formed dynamically or statically. Communication protocols, such as, Routing Information Protocol (RIP), Border Gateway Protocol (BGP), and Open Shortest Path First (OSPF) are examples of dynamic internetworking protocols that are used in IP internetworks.

FIG. 1C illustrates an internetwork from a point of view of a "sender" and "receivers". Requests may be sent from the sender to the receivers via a gateway, which is an entry point to one of the receiver networks. A manifestation of the gateway may be, for example, a wireless access point. For example, the FIG. 1C internetwork may be a utility network 100 such as is shown in greater detail in FIG. 1D.

FIG. 1D is a generalized block diagram of a utility network 100. Utility network 100 may include one or more electronic devices 101. The electronic devices 101 may be connected over a wireless local area network (LAN) 102. As shown in the FIG. 1D example, multiple wireless LANs may be formed, which may or may not overlap, such that a given electronic device can be connected to (or be part of) only one wireless LAN or to multiple wireless LANs. The electronic devices may be any type of electronic device. Examples of electronic devices include utility nodes, which may include a utility meter or may connect to a utility meter.

A utility meter is a device which is capable of measuring a metered quantity, typically a commodity like electricity, water, natural gas, etc. Utility nodes which connect to a utility meter may include a network interface card (NIC) for communicating on a network, and may include one or more RF transceivers for communicating on one or more wireless LANs. Other examples of electronic devices include communication devices, such as set top boxes (as may be used in cable television or satellite television delivery), household appliances (e.g. refrigerator, heater, light(s), cooking appliances, etc.), computers or computing devices (e.g. game consoles, storage devices, PCs, servers, etc.), phones or cell phones, battery storage device, transportation devices, transportation vehicles (for example: an electric or hybrid car or other vehicle), entertainment devices (e.g. TVs, DVD players, set top boxes, gaming consoles, etc.), or other device which may be found in a home, business, roadway or parking lot, or other location. The electronic devices may, in some examples, perform as gateways, relays or perform other functions related to interconnecting devices. The wireless LAN 102 may be any type of wireless network, and may use any frequency, communications channel or communications protocol.

In some examples of a utility network, the LANs 102 are connected to one or more access points (AP) 103. A given LAN may be connected to only a single access point, or may be connected to two or more access points. The access points 103 may be connected to one or more wide area networks (WAN) 104. The WANs 104 may be connected to one or more back office systems (BOS) 105. For a utility, the back office system may handle a variety of business or management tasks, including participation in the collection of metering information, managing metering devices, security for the network, or other functions as may be desired in a utility network. Examples of back office systems include billing and accounting systems, proxy servers, outage detection systems (as may be used in a utility network), data storage systems, etc.

Nodes within the communications network, which may be a LAN or a WAN, or a combination of both, may communicate with other nodes using one or more protocols at various communication layers. For example, some nodes may communicate using IPv6, some may be communicate using IPv4, while some may communicate using both IPv4 or IPv6. Some nodes may communicate by encapsulating IPv6 packets in an IPv4 packet. Additionally, some nodes may establish an IPv4 tunnel through an IPv6 network.

Congestion control can be described notionally as controlling the rate of entry traffic of packets into a given network with the goal of maximizing ideal throughput between communicating nodes while avoiding congestive collapse. Congestive collapse is a condition where there is little or no useful communication happening because of congestion.

In a packet switched internetwork such as an IP internetwork, there are two popular methods by which congestion control can be achieved:

1. Routers Discard Packets. Routers in an internetwork perform congestion control by discarding packets sent by nodes that would otherwise cause the maximum packet or data rate between two routers to be exceeded. Such an example is found in the method described in the paper "Random Early Detection (RED) Gateways for Congestion Avoidance" by Sally Floyd and Van Jacobson.
2. Non-Router Nodes Perform End-To-End Congestion Control. A node may use congestion avoidance algorithms like Transmission Control Protocol (TCP) congestion avoidance, which performs congestion control between two non-router nodes in an IP internetwork. TCP congestion avoidance has multiple variations, including the variations TCP Reno, TCP Tahoe, and TCP Vegas. The paper "Simulation-based Comparisons of Tahoe, Reno and SACK TCP" by Kevin Fall and Sally Floyd is a useful reference as is the paper "Congestion Avoidance and Control" by Van Jacobson.

Methods that are similar to the "Routers Discard Packets" method described above are not end-to-end congestion control models. "RED Gateway for Congestion Avoidance" by Sally Floyd and Van Jacobson describes a method by which routers and the intermediate hops of a path discard packets to enforce maximum link capacity.

Methods that are similar to TCP congestion avoidance, while end-to-end, do not consider the intermediate hops of an internetwork path as congestion points. In the TCP congestion avoidance technique, decisions on whether to send a packet are based on the communication success rate between two end-points in isolation.

SUMMARY

The exemplary embodiments described herein optimize aggregate packet traffic flow to a bandwidth constrained and dynamic network by adapting bandwidth utilization, and transmission delay in some examples, based on network conditions. This method of congestion control differs from other methods of congestion control that provide end-to-end congestion control and ignore control on aggregate flow between and within two networks.

An exemplary method of congestion control in an internetwork having plural networks is disclosed. The method comprises sending a request packet to a node in a second network; adjusting the value of a packet-in-flight counter when the request packet is sent to the second network node or based on whether a response packet is received from the second network node; and determining whether another request packet can be sent based on a value of the packet-in-flight counter and a value of a maximum packet-in-flight indication for the first network node. The maximum packet-in-flight indication is adjusted based on a statistic that is indicative of round trip time, which includes network latency and request processing time. In addition, packet transmission may be rate-limited to control a rate of transmission at one or both of a packet level and a byte level. Rate control at a byte level may be based on one or more of requests and responses to requests.

Another exemplary method is directed to congestion control in a first network of an internetwork of plural networks. The method comprises sending a first request packet from a node in a first network to a node in a second network; incrementing a packet-in-flight counter of the first network for the second network; and initiating a timer of the first network. The method further comprises decrementing the packet-in-flight counter of the first network for the second network when a response packet is received from the second network node or an expiry time of the timer is exceeded; and determining whether a second request packet can be sent from the first network based on a value of the packet-in-flight counter and a value of a maximum packet-in-flight indication for the first network. The maximum packet-in-flight indication may be adjusted based on a statistic that is indicative of round trip time. In addition, packet transmission may be rate-limited to control a rate of transmission at one or both of a packet level and a byte level. Rate control at a byte level may be based on one or more of requests and responses to requests.

An exemplary computer readable medium is encoded with a program for executing congestion control of a first network in an internetwork of plural networks. The computer readable medium comprises a first module that allows a request packet to be sent to a node in a second network; a second module that adjusts the value of a packet-in-flight counter based on one of sending the request packet to the second network node, receiving a response packet from the second network node, and an expiry time of a timer associated with the request packet; and a third module that determines whether another request packet can be sent based on a value of the packet-in-flight counter and a value of a maximum packet-in-flight indication of the first network for the second network. The maximum packet-in-flight indication may be adjusted based on a statistic that is indicative of roundtrip time for request packets sent from the first network. In addition, packet transmission may be rate-limited to control a rate of transmission at one or both of a packet level and a byte level. Rate control at a byte level may be based on one or more of requests and responses to requests.

An exemplary method is directed to congestion control in an internetwork having plural networks. The method comprising in a first network among said plural networks, establishing a plurality of packet queues and packet-in-flight counters that are respectively associated with other networks among said plural networks. For request packets that are to be sent from a node in the first network to a node in a given one of said other networks, the method further comprises loading the packet associated with the given network queue with at least one request packet, wherein the at least one request packet is destined for a node in the given other network of the internetwork; sending the at least one request packet to the node in the given other network; adjusting a value of the packet-in-flight counter associated with the given other network in one direction when the request packet is sent to the node in the given other network, and adjusting said packet in-flight counter in the other direction when a response packet is received from the node in the given network; and determining whether another request packet can be sent to the node in the given network based on a value of the packet-in-flight counter and a value of a maximum packet-in-flight indication for the first network node. The maximum packet-in-flight indication may be adjusted based on a statistic that is indicative of roundtrip time for request packets sent from the first network, such as round trip time. In addition, packet transmission may be rate-limited to control a rate of transmission at one or both of a packet level and a byte level. Rate control at a byte level may be based on one or more of requests and responses.

In one aspect, the invention is a packet scheduler that significantly improves the use of network bandwidth from back office to the utility nodes (such as utility meters), resulting in speedier meter operations overall, such as meter data reads and firmware upgrades. The invention described works well in a dynamic wireless network with varying roundtrip times and access point throughput. The invention also incorporates an adaptable Packet-in-Flight (PIF) scheduler that determines dynamically determines a PIF limit based on measured roundtrip time. The scheduler may be further enhanced by a packet or byte rate limiter that can help to minimize a burstiness characteristic of the PIF scheduler, which can have an adverse effect on communication within the inter-network.

DESCRIPTION OF THE DRAWINGS

In the following, exemplary embodiments of the invention will be described in greater detail with reference to the drawings, wherein:

FIGS. 2B to 2D are flow diagrams of congestion control methods.

DETAILED DESCRIPTION

In a typical network environment, a congestion control mechanism attempts to reduce traffic congestion; however conventional congestion control algorithms disregard the aggregate flow between and within two networks. In a traditional TCP/IP network, congestion control mechanisms work well; however there are problems in a system of interconnected networks as these networks may be bandwidth constrained at any of a number of places in the network.

For example, optimization for the network may be done locally i.e. between two end points, instead of globally i.e. between two networks in the aggregate. Also, end-to-end congestion may require a large amount of resources, as state is maintained for each end-to-end pair. This is particularly so where, for example, a system in one network communicates with a large number of nodes (e.g., as many as millions of nodes) in other networks, and maintaining states for so many end-to-end pairs may not be viable.

Figure 1A:
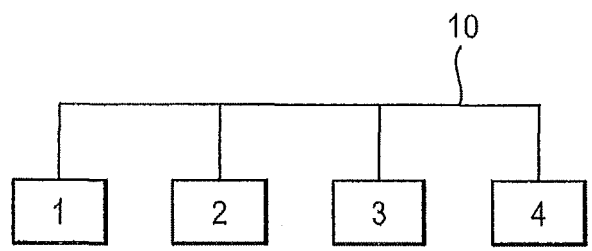
FIG. 1A is a generalized block diagram of a conventional computer network.
Figure 1B:
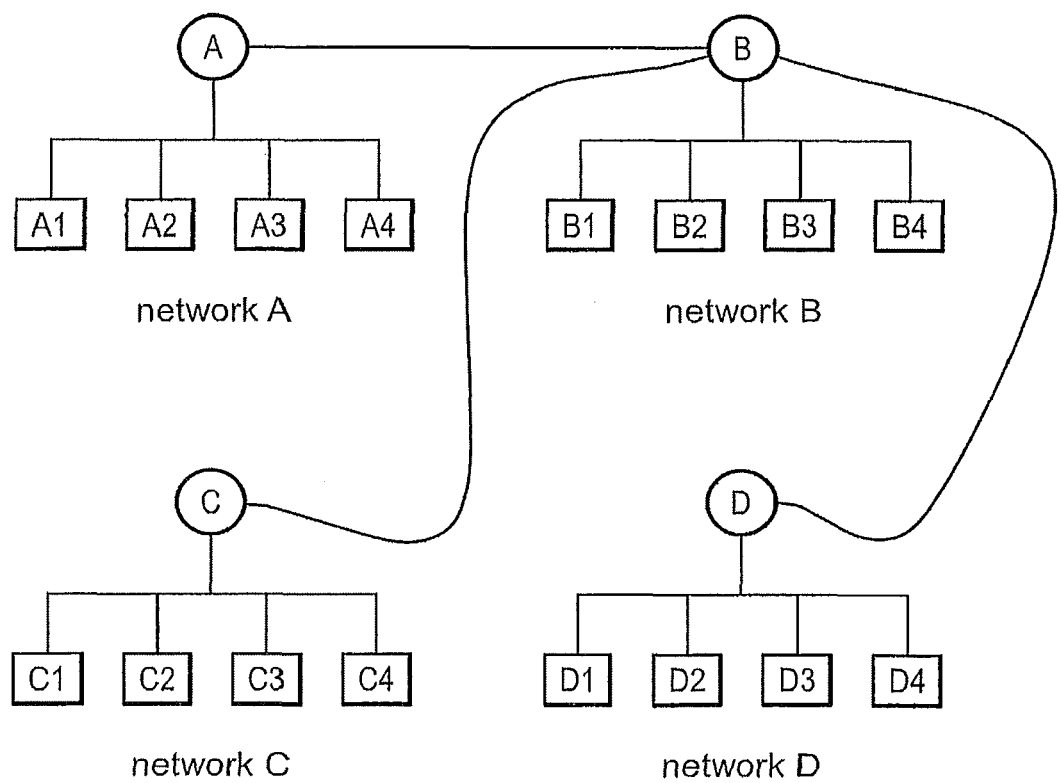
FIG. 1B is a block diagram of a conventional internetwork.
Figure 1:
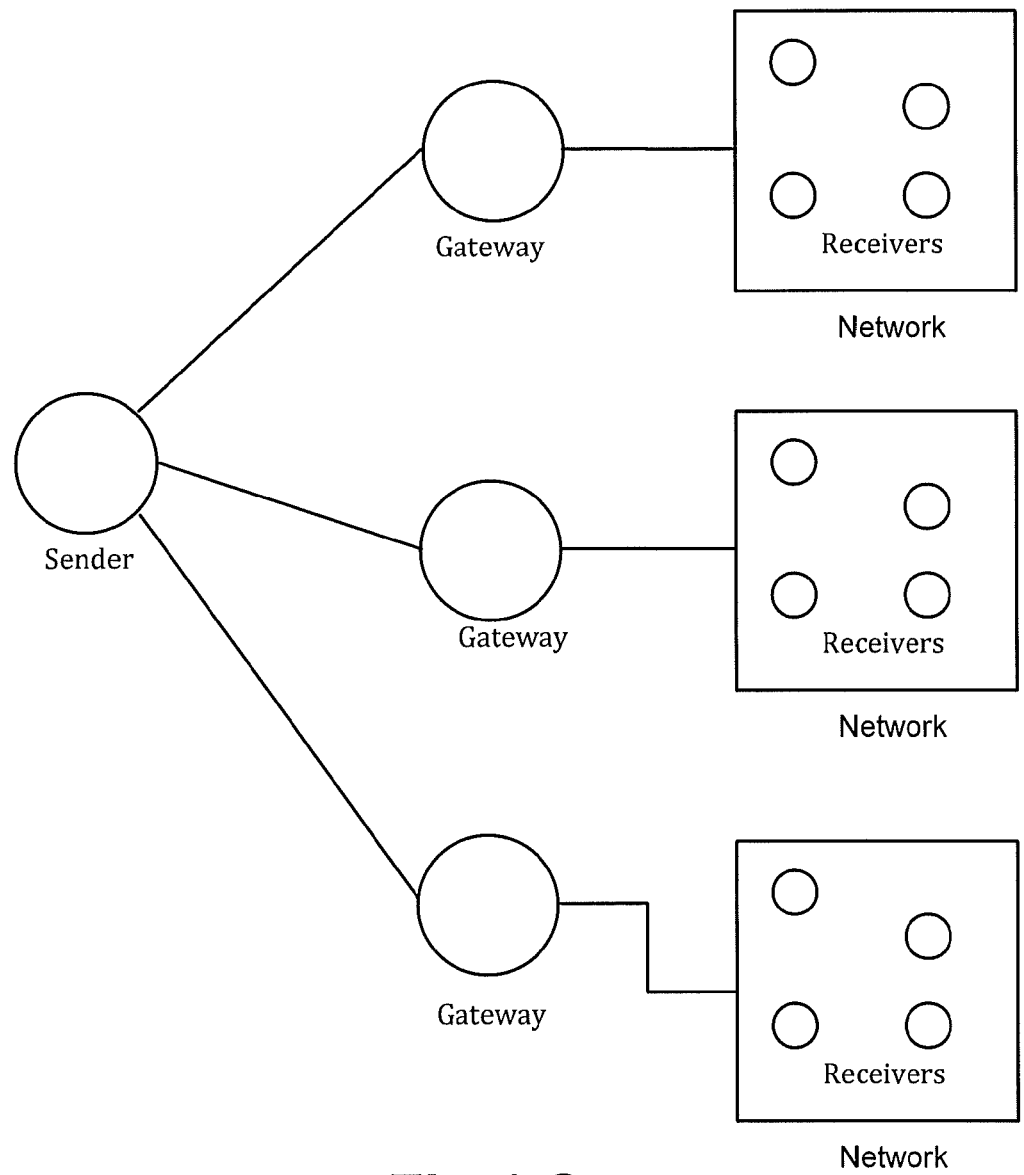
FIG. 1C is a block diagram illustrating a conventional internetwork from a point of view of a "sender" and "receivers."
FIG. 1D is a generalized block diagram of a utility network.

We now describe various exemplary embodiments that address issues of congestion control in a network as a whole as opposed to, generally, in an end-to-end manner such as with TCP-based congestion control mechanisms. In this description, FIGS. 1A-1C and the corresponding description are provided as background. FIGS. 2A to 5 and the corresponding description are generally reproduced (with some change in terminology) from related United States Patent Application Publications 20100195495 and 20100214922. FIGS. 6-7b and the corresponding description are more particularly directed to an adaptive PIF scheduler with an optional rate limiter.

Figure 2A:
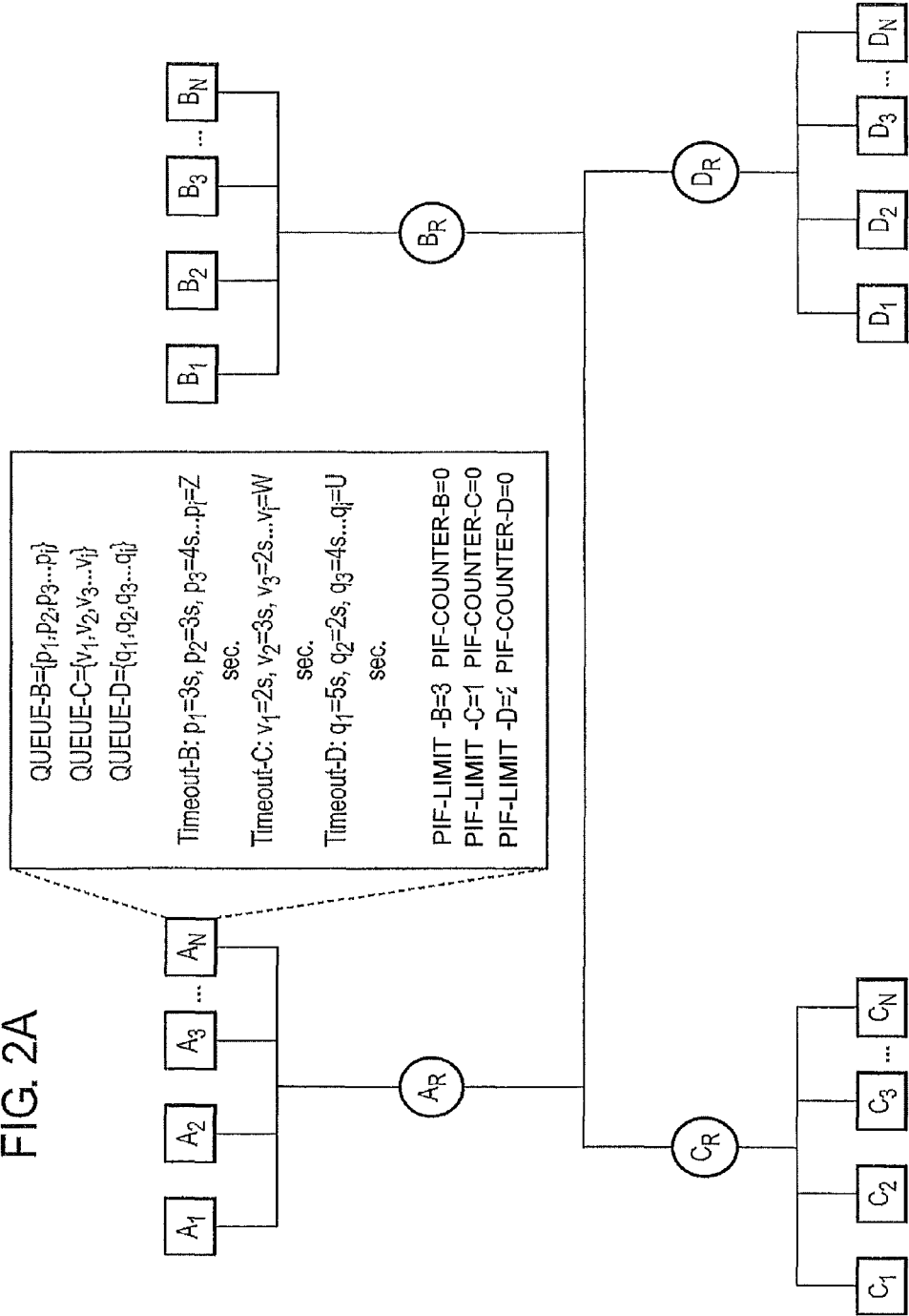
FIG. 2A is a schematic diagram of an internetwork in accordance with an exemplary embodiment.

FIG. 2A is a schematic diagram of an internetwork in accordance with an exemplary embodiment. As shown in FIG. 2A, a packet switched internetwork 200 includes packet switched networks A through D. Each of the packet switched networks includes plural non-gateway nodes and at least one gateway node. The gateway node may be, for example, a relay, access point, router, or other device that interconnects two or more networks. For example, network A includes plural non-gateway nodes A1-AN and a gateway AR, network B includes plural non-gateway nodes B1-BN and a gateway BR, network C includes plural non-gateway nodes C1-CN and a gateway CR, and network D includes plural non-gateway nodes D1-DN and a gateway DR. Hereinafter, common characteristics of a packet switched network in internetwork 200 will be described with respect to exemplary Networks X and Y (not shown).

In an exemplary embodiment, a non-gateway node in an IP internetwork can be configured to send packets to other non-gateway nodes in the internetwork 200. The node that sends such packets over the internetwork will hereafter be known as the "Sending Node." The nodes that are intended to receive packets over the internetwork will hereafter be known as the "Receiving Nodes." Specifically, the exemplary embodiment addresses an instance in which a Sending Node in a given packet switched network of a packet switched internetwork sends packets to Receiving Nodes of different networks in the same internetwork.

For example, Node A2 (the Sending Node) in Network A can be configured to send packets to Receiving Nodes Node B1, Node B2, Node B3, and Node B4 on Network B; Node C1, Node C2, Node C3, and Node C4 on Network C; and Node D1, Node D2, Node D3, and Node D4 on Network D.

It is generally true that whenever a Sending Node sends a packet to a Receiving Node, the Sending Node may expect a packet as acknowledgement in response to the original sent packet within some amount of time after the original packet was sent. The acknowledgement packet may contain only an acknowledgement or may contain response data (which implies acknowledgement). The packet originating from the Sending Node will be referred to as the Request Packet, and the packet sent by the Receiving Node as the Response Packet.

For any internetwork, the path between a node in one network to a node in any other network may have a maximum (possibly variable) latency and data throughput rate. An exemplary embodiment provides a method for end-to-end congestion control that uses the maximum capacity of the inter-network as a whole as the primary consideration when deciding whether a packet is to be sent.

At the Network X, each other packet switched network in the internetwork, such as a Network Y (not shown), has an associated packet queue. For example, a QUEUE-Y designates a queue of Request Packets that are to be sent from a node in Network X to Receiving Nodes in the Network Y. An implementation of the packet queue is shown in FIG. 2A. For example, Network A can include a QUEUE B, a QUEUE C, and QUEUE D. Similarly, although not shown, Network B can include a QUEUE-A, a QUEUE-C, and a QUEUE D; Network C can include a QUEUE A, a QUEUE B, and a QUEUE D; and Network D can include a QUEUE A, a QUEUE B, and a QUEUE C.

A timeout value Timeout is associated with each Request Packet that a Sending Node sends to a Receiving Node. The value of Timeout for each Request Packet need not be the same, and may in fact be different for every Request Packet sent by the Sending Node. The value Timeout represents the maximum time in seconds (possibly fractional) that the Sending Node will wait to receive a Response Packet from the Receiving Node before declaring that either the Request Packet or the Response Packet is lost.

A maximum allowable packets-in-flight (PIF) counter can be defined at one network in the internetwork for each other network in the internetwork 200. For example, with regard to the Network X, a packets-in-flight limit with respect to Network Y can be designated as PIF-LIMIT-Y. The limit PIF-LIMIT-Y for the Network Y can be assigned an initial integer value that is greater than 0. Moreover, the initial value for each PIF-LIMIT at the Network X can be different for each network. The PIF-LIMIT value represents the maximum number of unacknowledged request packets that may be sent to a given network (i.e., "in flight" between the Network X and any receiving node of the given network). An exemplary implementation of the packets-in-flight limit is shown in FIG. 2A. For example, for the Network A, a PIF-LIMIT-B is associated with Network B, a PIF-LIMIT-C is associated with Network C, and a PIF-LIMIT-D is associated with Network D.

An unacknowledged request packet is a request packet for which either a response packet has not yet been received by the Sending Node or for which an expiry time has not yet been exceeded. The expiry time can be defined as follows:

Expiry-Time=Current-Time+Timeout.

Plural current unacknowledged packets-in-flight counters can be defined at one network in the internetwork for each other network in the internetwork. For an exemplary Network X, the current unacknowledged packets-in-flight counter for a Network Y can be designated as PIF-COUNTER-Y. The PIF-COUNTER value can be an integer value having an initial value 0. The PIF-COUNTER value represents the current number of unacknowledged request packets that have been sent to a given network. As defined earlier, an unacknowledged request packet is a request packet for which either a response packet has not yet been received by the Sending Node or for which the expiry time has not yet been exceeded. An exemplary implementation of the current unacknowledged packets-in-flight counter is shown in FIG. 2A. For example, with respect to Network A, a PIF-COUNTER-B is associated with Network B, a PIF-COUNTER-C is associated with Network C, and a PIF-COUNTER-D is associated with Network D.

Figure 2B:
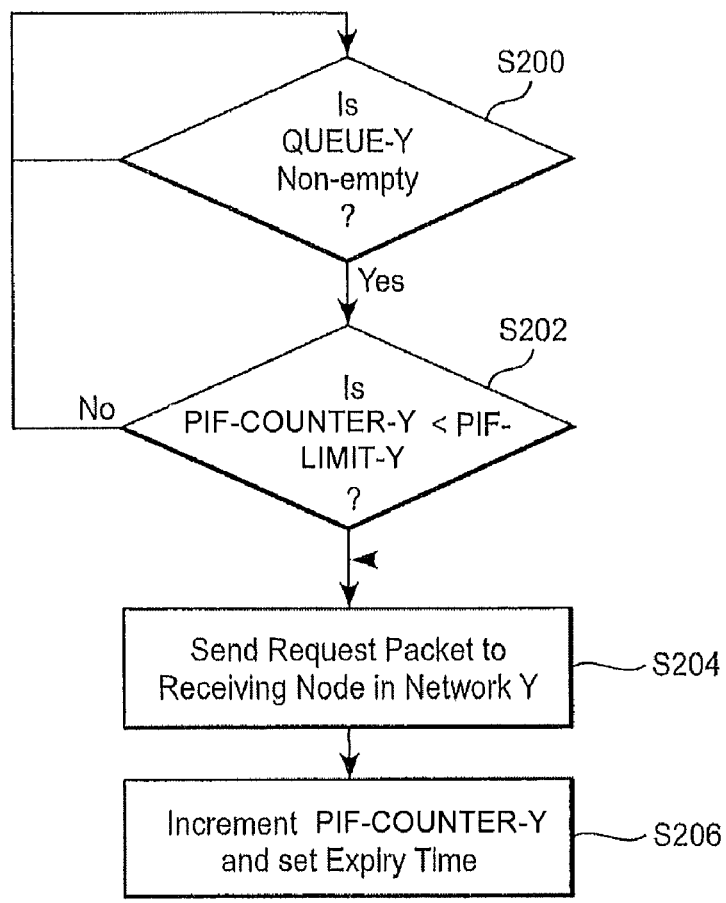
Figure 2C:
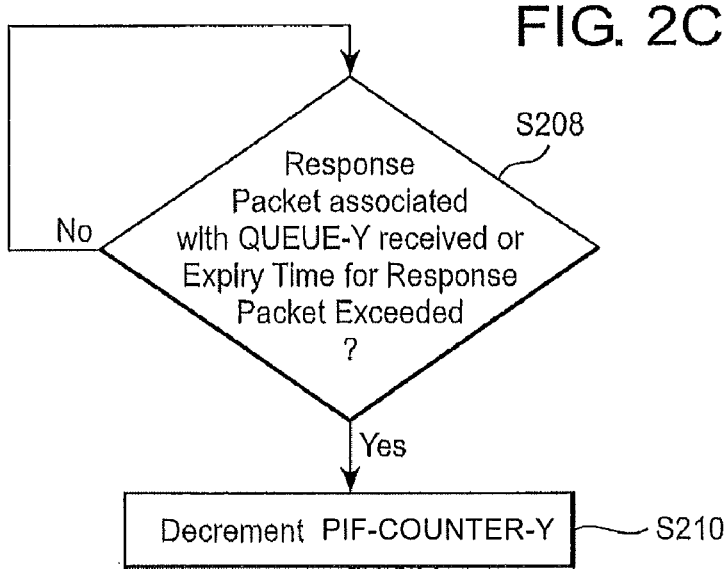

FIGS. 2B and 2C are flow diagrams of a congestion control method in accordance with an exemplary embodiment.

As shown in FIG. 2B, a sending node of a Network X can send a request packet to a receiving node if two conditions are met. First, for the Network X, the packet queue QUEUE-Y associated with a receiving node in Network Y must be non-empty (S200). Second, the PIF-COUNTER-Y value associated with the Network Y must be less than the PIF-LIMIT-Y also associated with the Network Y (S202). If these two conditions are met then a packet is removed from QUEUE-Y in Network X and sent to the Receiving Node in Network Y (S204). The value of PIF-COUNTER-Y is incremented and the expiry time of the sent Request Packet is set to be Expiry-Time=Current-Time+Timeout (step S206). On the other hand, if the value of PIF-COUNTER-Y is equal to PIF-LIMIT-Y, then the Sending Node in Network X does nothing at that time.

As shown in FIG. 2C, if a Response Packet is received at Network X from a Receiving Node in Network Y, the counter PIF-COUNTER-Y is decremented (S208). On the other hand, if a Response Packet is not received at Network X from a Receiving Node in Network Y, the Sending Node determines whether the Expiry-Time is exceeded (S208). If the Expiry-Time for a Request Packet sent to a Receiving Node in Network Y has been exceeded, then the counter PIF-COUNTER-Y is decremented (S210). Whenever the value of the limit PIF-LIMIT-Y for any given Network Y is greater than 0, then for a Sending Node in a Network X, Step S200 can be repeated with respect to a Receiving Node in a Network Y.

In an alternative embodiment, rather than incrementing a counter when a packet is sent to a Receiving node and decrementing a counter when a packet is received from a Receiving node or the expiry time has been exceeded, the system can be configured to decrement a counter when a packet is sent and increment a counter when a packet is received or the expiry time has been exceeded.

Figure 3:
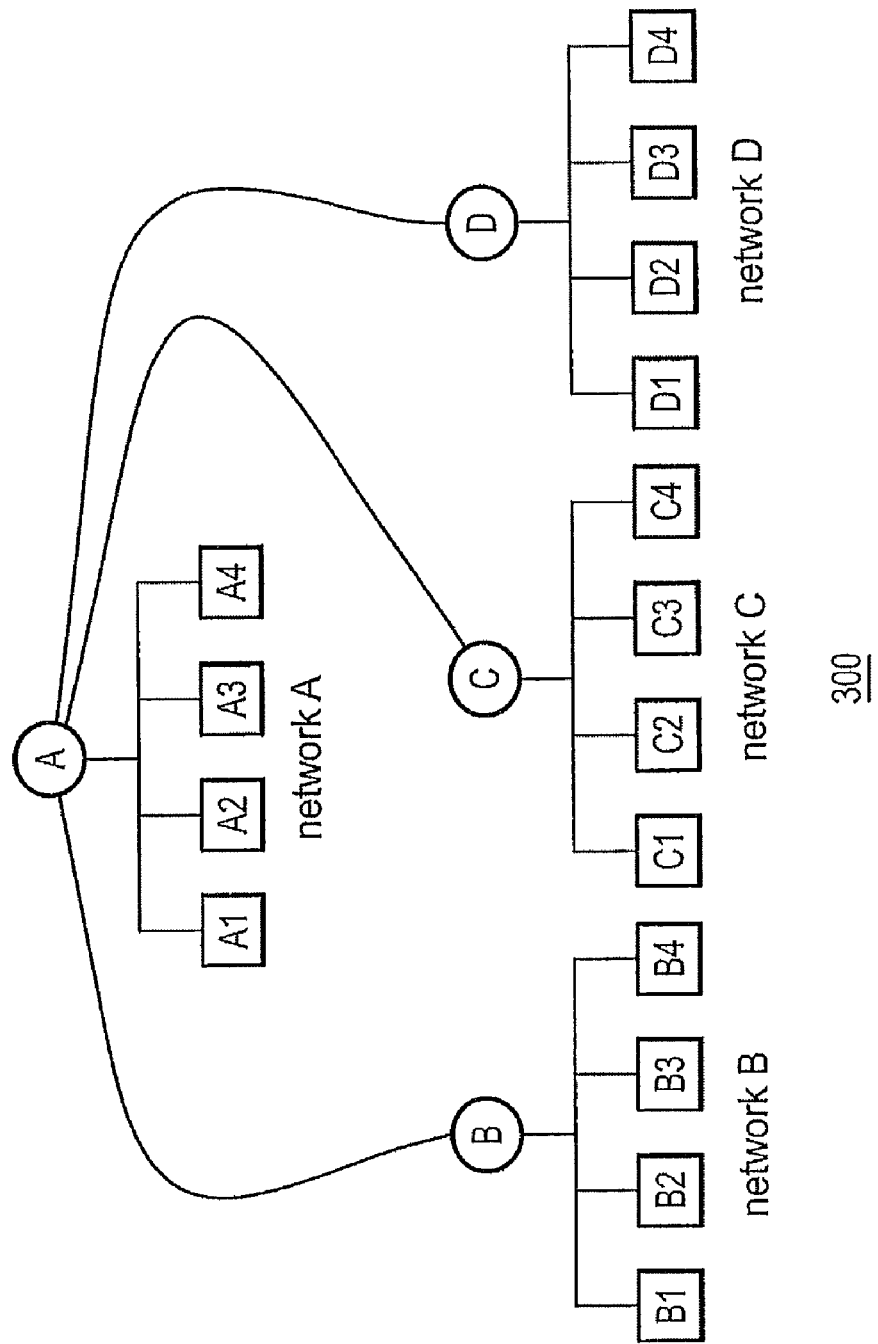
FIG. 3 is a schematic diagram of an internetwork in accordance with an exemplary embodiment.

FIG. 3 is a schematic diagram of an internetwork in accordance with an exemplary embodiment.

As shown in FIG. 3, an internetwork 300 includes plural networks designated as network A, network B, network C, and network D. Each network is comprised of plural nodes. The plural nodes and their membership to a respective network can be defined as follows:

Network A includes nodes A1, A2, A3, A4;
Network B includes nodes B I, B2, B3, B4;
Network C includes nodes C I, C2, C3, C4; and
Network D includes nodes D1, D2, D3, D4

The internetwork 300 may have any number of networks and each network may have any number of plural nodes as desired. The number of networks and the number of nodes per network can vary by implementation.

In an exemplary implementation based on the internetwork 300, Node A1 can send a Request Packet to each of the nodes B1, B2, B3, B4, C1, C2, C3, C4, D1, D2, D3, D4. (For example, Node A1 may be a back office system (BOS) such as a BOS 105 illustrated in FIG. 1D.) In order to distinguish one packet from another packet, the Request Packets destined to each of the nodes can be denoted with the label RP:RECEIVING-NODE. For example, a Request Packet destined for Receiving Node B1 is labeled as RP:B1, and a Request Packet destined for Receiving Node C2 is labeled as RP:C2, and so on.

Each of the Request Packets destined for nodes B1-B4, C1-C4, and D1-D4 can be enumerated as follows:

RP:B1, RP:B2, RP:B3, RP:B4, RP:C1, RP:C2, RP:C3, RP:C4, RP:D1, RP:D2, RP:D3, and RP:D4.

Each Request Packet has an associated expiry time or timeout value T in seconds. The timeout values for the Request Packets need not all be the same, and can be unique for each Request Packet as desired.

The Request Packets are organized based on the destination network to which the Receiving Nodes correspond. That is, for the Network A, a queue can be created for each of the Networks B, C, and D, where a Request Packet is a member of the queue if the destination node associated with the Request packet is a member of the network associated with the queue. Furthermore, the Packets-In-Flight limit (PIF-LIMIT) variable can be set to some initial value for each of the queues, and the Unacknowledged Packets-In-Flight (PIF-COUNTER) variable for each of the queues can be set to 0.

In the discussion below, the congestion control method as shown in FIGS. 2B and 2C will be described in the context of an implementation of internetwork 300.

A Node A1 can send a Request Packet to any of the nodes B1-B4, C1-C4, and D1-D4, if each network queue is non-empty and the value of PIF-LIMIT for each queue is initialized (S200).

FIG. 4A illustrates an exemplary status of each queue following the completion of S200. As shown in FIG. 4A, each queue is loaded with respective Request Packets, and an PIF limit value for each queue is initialized to PIF-LIMIT-B=3, PIF-LIMIT-C=1, PIF-LIMIT-D=2.

A Request Packet can be removed from a queue and sent to the designated receiving node, if the PIF-COUNTER value of a queue is less than the respective PIF-LIMIT value (S202, S204). Also, the PIF-COUNTER value is incremented by one (S206). If, on the other hand, the PIF-COUNTER value of the queue is not less than the respective PIF-LIMIT value of the queue then the process returns to step S200 to determine whether the queue is non-empty.

Steps S200-S206 can be repeated for each queue until the PIF-COUNTER value is equal to the PIF-LIMIT value.

FIG. 4B illustrates an exemplary status of queues QUEUE-B, QUEUE-C, and QUEUE-D of Network A following the completion of step S206 and when the PIF-COUNTER value is equal to the PIF-LIMIT value.

In comparing FIGS. 4A and 4B, it can be seen that packets have been removed from their respective queues, and sent to a designated Receiving Node based on the queue and network to which each respective packet is associated as follows:

Network B, Queue B: RP:B4, RP:B3, RP:B2
Network C, Queue C: RP:C3
Network D, Queue D: RP:D4, RP:D1

Whenever the PIF-COUNTER value of a network is less than the PIF-LIMIT value of the network, packets for a queue associated with the network can be removed. Upon removal from the queue, the packets are sent to the designated Receiving Node, and the value of counter PIF-COUNTER is updated to reflect the number of packets that are unacknowledged. A packet is unacknowledged when no response has been received from the Receiving Node or the expiry time of the packet has not been exceeded.

Turning again to the congestion control method of FIG. 2C a packet is declared lost if an expiry time for a sent packet is exceeded. Alternatively, a packet communication is successful if a respective Response Packet is received (S208). In either case, the value of counter PIF-COUNTER for the Network is decremented by one (S210).

For example, if RP:C3 is declared successful or lost, then the value of PIFUNACKED-C is decremented by one such that PIF-COUNTER-C=0.

FIG. 4C is a schematic diagram that reflects an exemplary status of each queue in Network A following the completion of step S208.

As shown in FIG. 4C, PIF-COUNTER-C=0, which is less than PIF-LIMIT-C=1. As a result, the next packet in QUEUE-C is removed (RP:C 1) and sent to the Receiving Node C1. The PIF-COUNTER-C value is incremented by 1 such that PIF-COUNTER-C=1.

FIG. 4D is a schematic diagram illustrating an exemplary status of each queue following the completion of step S210. As shown in FIG. 4D, RP:C1 has been removed from QUEUE-C and PIF-COUNTER-C=1.

The set of Request Packets that are to be sent need not be fixed. For example, if during the life of an application running on a Sending Node, an additional packet is to be sent to another node, the Request Packet can be loaded into the appropriate queue associated with the appropriate network.

The algorithm shown in FIGS. 2B and 2C can be executed by a processor at a Sending Node or somewhere in the network to which the Sending Node belongs, so that congestion control can be performed on a per network basis.

Figure 4E:
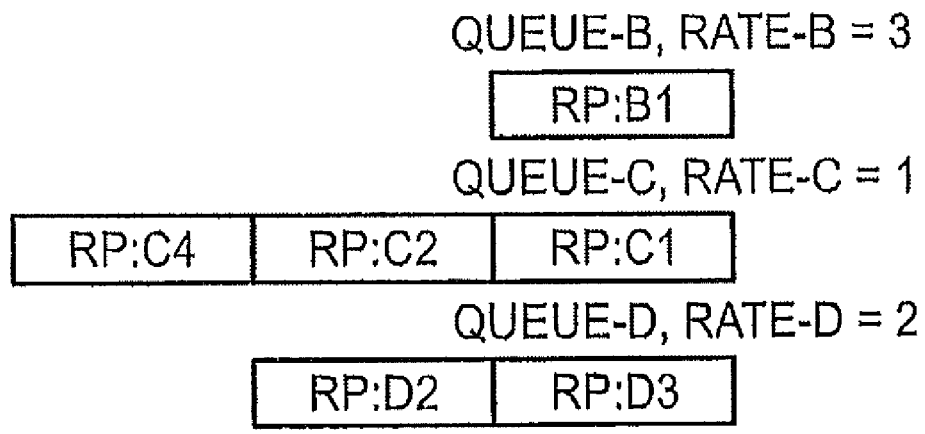
FIGS. 4A-4F are schematic diagrams of each network queue during the congestion control process in accordance with exemplary embodiments.
Figure 4:
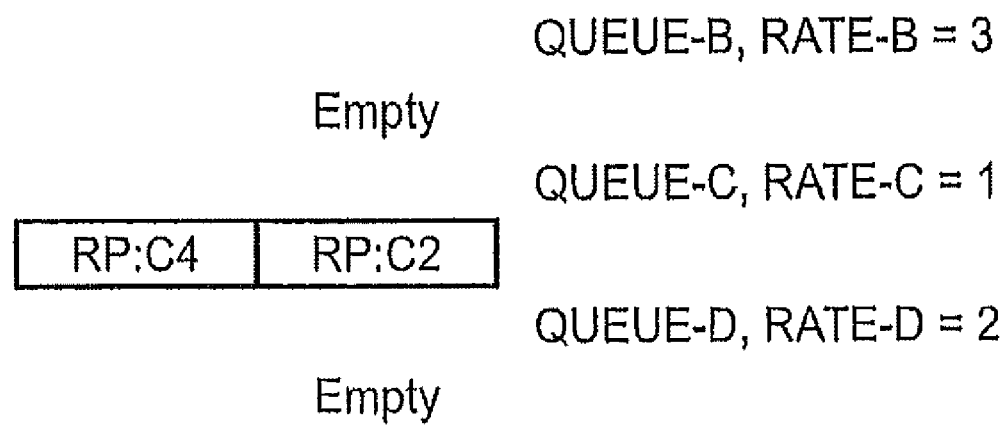

FIG. 4E illustrates an exemplary status of queues QUEUE-B, QUEUE-C, and QUEUE-D of Network A following the completion of step S216 (of FIG. 2D) after a first RATE-INTERVAL has elapsed. In comparing FIGS. 4A and 4E, it can be seen that packets have been removed from their respective queues, and sent to a designated Receiving Node based on the queue and network to which each respective packet is associated as follows:

Network B, Queue B: RP:B4, RP:B3, RP:B2
Network C, Queue C: RP:C3
Network D, Queue D: RP:D4, RP:D1

After a rate interval number of seconds have elapsed, steps S212-S216 (of FIG. 2D) can be repeated until each queue is empty. Whenever the QUEUE associated with a network is non-empty and the rate interval has elapsed, packets in the QUEUE can be removed based on the RATE of the QUEUE. Upon removal from the queue, the packets are sent to the designated Receiving Node.

After another rate interval has elapsed, each queue is once again examined to determine the number of packets to process. Based on the examination, one (1) packet is removed from QUEUE-B, one (1) packet is removed from QUEUE-C, and two (2) packets are removed from QUEUE-D (S214 of FIG. 2D). Although QUEUE-B has a packet rate RATE-B=3, because only one (1) packet remains in the queue, only one packet can be removed. The packets removed from QUEUE-B, QUEUE-C, and QUEUE-D are sent to the receiving nodes (S216 of FIG. 2D).

FIG. 4F illustrates an exemplary status of queues QUEUE-B, QUEUE-C, and QUEUE-D following the completion of S216 of FIG. 2D after the second rate interval. As shown in FIG. 4F, only QUEUE-C has packets remaining after the second rate interval. As a result, steps S212-S216 (of FIG. 2D) will be repeated for a third and fourth rate interval at a packet rate RATE-C=1, until QUEUE-C is empty.

The set of Request Packets that are to be sent need not be static. For example, if during the life of an application running on the Sending Node, an additional packet is to be sent to another node, the Request Packet can be loaded into the appropriate queue associated with the appropriate network, and transmitted as packets continue to be removed from the queue.

The algorithm shown in FIG. 2D can be executed by a processor at a Sending Node or by a processor associated with the network to which the Sending Node belongs (such as a processor of any node of the network to which the Sending Node belongs) so that congestion control can be performed within the network to which the Sending Node belongs, on the basis of each receiving network.

The exemplary embodiments can be implemented in a variety of different types of communication systems. One illustrative example is a utility monitoring and control network.

Figure 5:
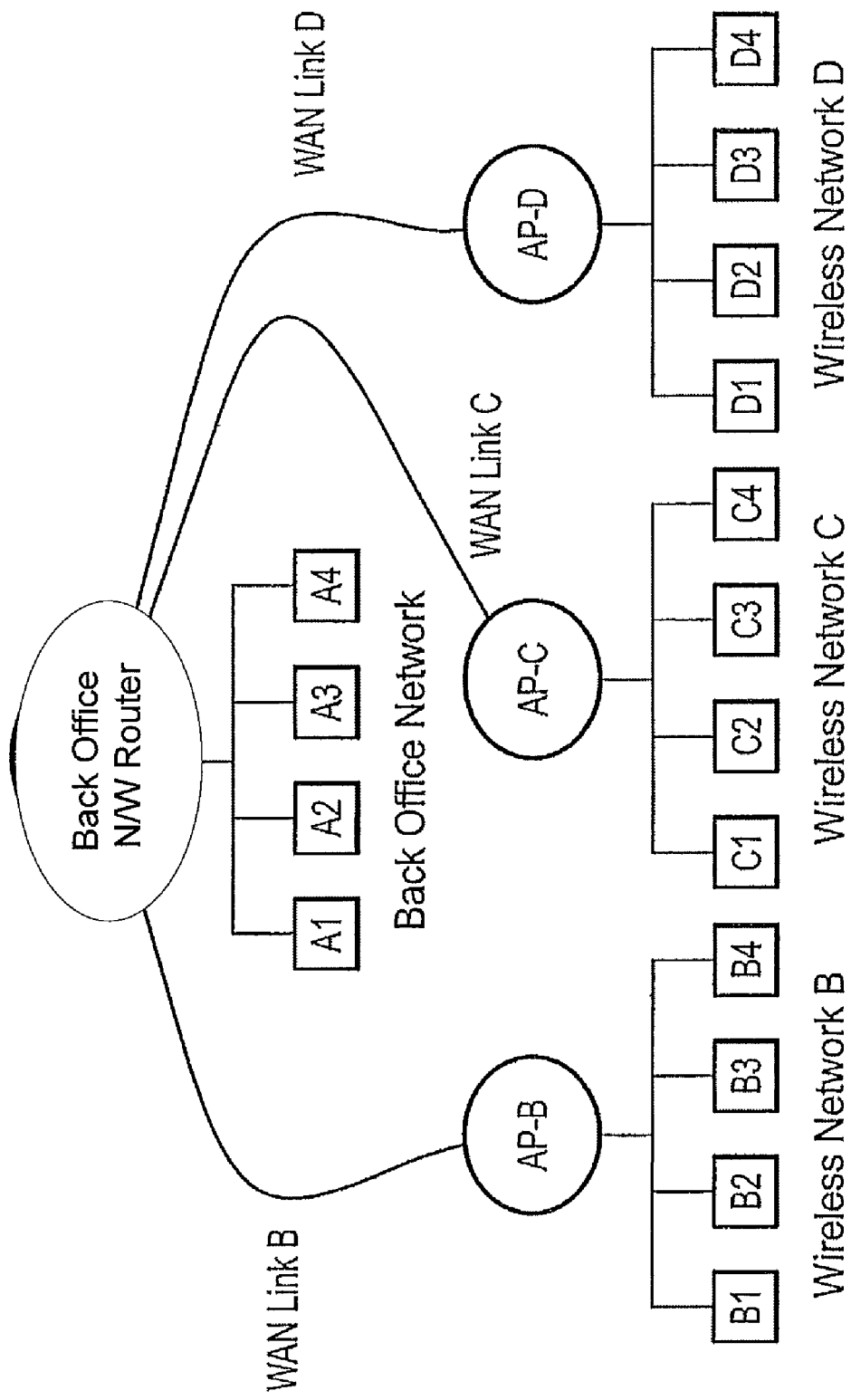
FIG. 5 is a schematic diagram of a conventional utility monitoring and control network.
Figure 6:
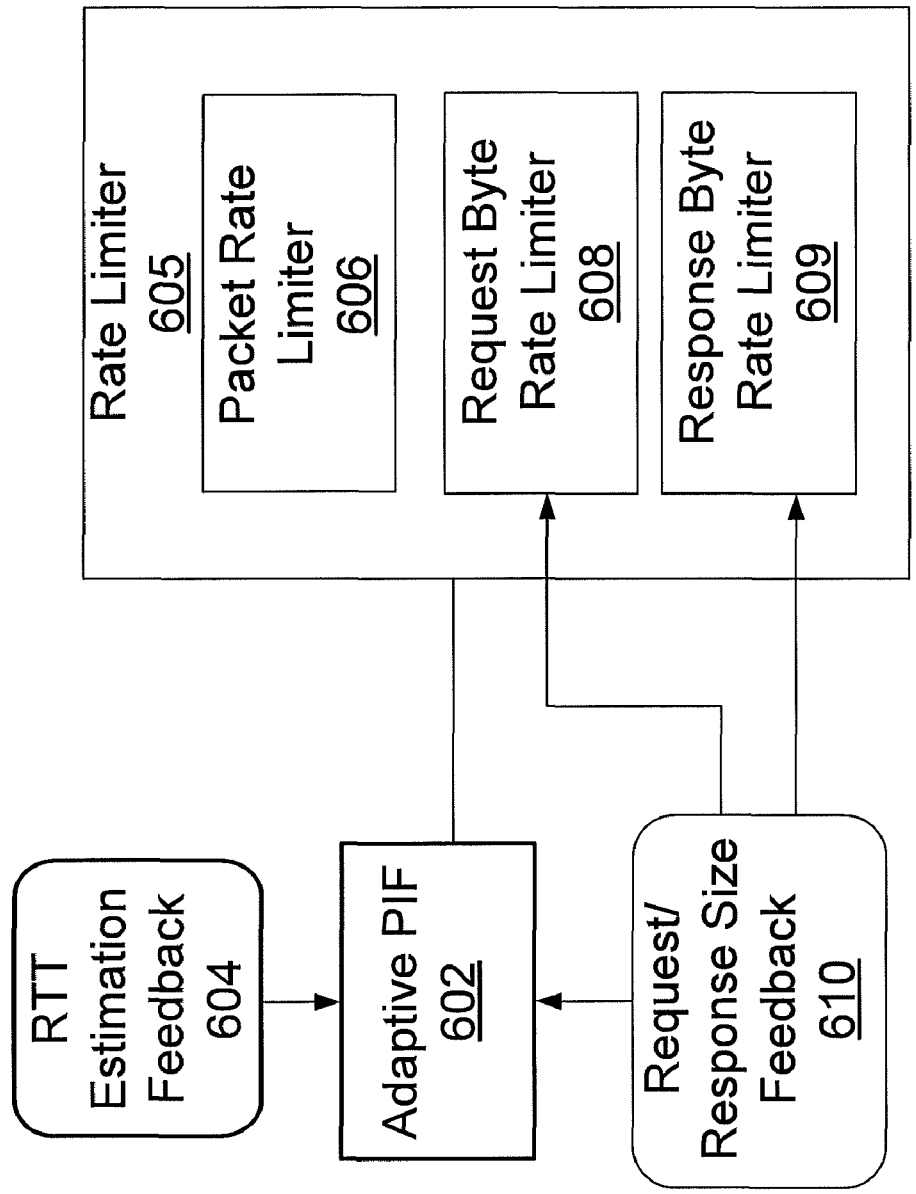
FIG. 6 is an architecture diagram illustrating an example of a rate-limited adaptive PIF scheduler.

FIG. 5 is a schematic diagram of a utility monitoring and control network in accordance with an exemplary embodiment. The utility monitoring and control network can be configured based on the exemplary internetwork implementation of FIG. 3. The exemplary utility monitoring and control network can have the following node and network definitions:

Network A can be designated as a Wide Area Network including at least one Utility Back Office System node. That is, one or more of the nodes A1-A4 may be Utility Back Office System nodes.

Router A can be designated as a Back Office Network router.

Router B, Router C, and Router D can be designated as Wireless Access Points and hereinafter referred to as Access Point B, Access Point C, and Access Point D, or AP-B, AP-C, and AP-D, respectively.

Network B, Network C, and Network D can be designated as Wireless Mesh Networks.

Interlinks between Router-A, AP-B, and AP-C can be Wide Area Network (WAN) Links. The nature of the WAN Link can be one of numerous types, including Ethernet, Code Division Multiple Access (CDMA), General Packet Radio Service (GPRS), Evolution Data Optimized (EVDO), Wideband Code Division Multiple Access (WCDMA), or any other suitable WAN Link as desired.

Each of the Nodes B1-B4, C1-C4, and D1-D4 can be designated as nodes in a wireless mesh network.

Each of the Nodes B1-B4, C1-C4, and D1-D4 can be connected via a serial line to a utility metering device. The utility metering device can be designated as an electric meter, a gas meter, or a water meter of either residential or commercial and industrial variety, or any other suitable metering device as desired.

The processor of each of the Nodes B1-B4, C1-C4, and D1-D4 can be configured through software to send queries and commands to connected utility metering devices and send the results of those queries and commands to other nodes in the internetwork based on the congestion control algorithm illustrated in FIGS. 2B and 2C.

The inventors have also realized that, in some examples, the throughput performance of a Packet-in-Flight scheduler may be sensitive to round trip time (RTT), which is a statistic that is indicative of network latency and processing time for request packets sent from the network to which first network node belongs to any node of a second given network, and the throughput performance may also be sensitive to the value of the chosen PIF limit.

Figure 1D:
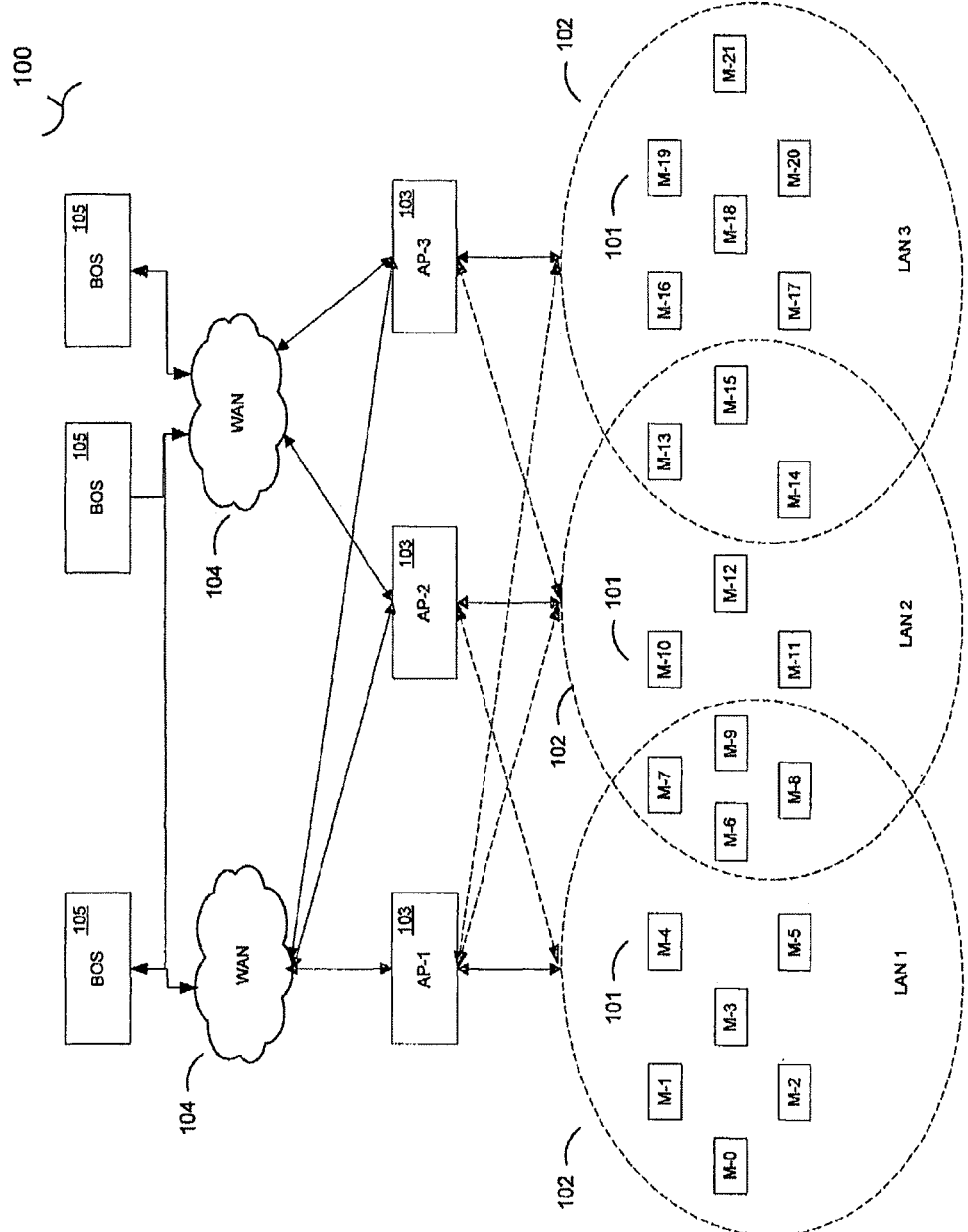

For example, referring to FIG. 1D, the requests may be sent from the back office system (BOS) 105 to the receivers 101 in local area network (LAN) 102 via an access point (AP) 103. The links 105-103, 103-101, and 101-101 may be bandwidth limited and, furthermore, the bandwidth may be dynamic due to changing link conditions.

An adaptive PIF scheduler may be deployed in the network of the sender, such as in a BOS, to control aggregate traffic flow between the BOS and each of the APs independently, in turn also controlling the flow between each AP and the receivers connected for communication using that AP. The scheduler speeds up or slows down a rate of sending requests on a per-gateway basis according to an adaptive PIF algorithm based, for example, on an examination of the number of unacknowledged packets in flight and the round trip time associated with the given gateway. The traffic to each gateway may be further shaped by a rate limiter to reduce burstiness and to set a throughput limit.

For example, without an adaptive PIF algorithm, the scheduler may cause packets to be sent too slowly if the RTT is large (e.g., due to the packets including commands that are time consuming for a receiving network node to process before providing a response and/or due to a high hop count to the ultimate destination network node). Furthermore, in some examples, a static PIF limit (of, for example, 20 or even 30) may not be large enough to maintain high throughput for large RTT that occurs during very time consuming operations or in a network with high latency. Allowing the PIF limit to increase can compensate for the low throughput that is indicated by large RTT.

Regarding burstiness, without rate limiting, the PIF scheduler may allow bursty traffic, which can increase packet loss. Traffic may become more bursty as the PIF limit increases. Bursts can overflow a gateway queue, increase queuing time in the gateway queue, and possibly result in collisions in the PHY/MAC layer. The PIF scheduler may use up a lot of or all available network bandwidth, leaving other applications with little or no network bandwidth.

Generally, it is preferable for a constant rate limiter and adaptive PIF scheduler to coexist to achieve the best performance, though either method may in and of itself provide satisfactory operation. They complement one another and generally, then, performance may be optimized if these two mechanisms are not decoupled. As discussed above, with an adaptive PIF scheduler, rate limiting operates to reduce burstiness as the PIF limit increases. A constant rate limit may not work well in a dynamic wireless network, where throughput may fluctuate rapidly due to changing network conditions. Thus, if the constant rate limit is set too high, packets may be sent too fast when network condition is bad, resulting in packet loss. On the other hand, if the rate limit is set too low, the network may be underutilized when conditions improve. It is noted that a TCP-based dynamic congestion control algorithm relies on receipt of acknowledgements and/or lack thereof to adjust sending rates, in an end-to-end manner. In a dynamic network where the link condition is often good but routing often changes and/or endpoints go up and down, lack of acknowledgements may not be a good indication for network condition and, in such a situation, TCP-based congestion algorithms may overly slow down packet sending rates.

FIG. 6 is an architecture diagram illustrating an example of a rate-limited adaptive PIF scheduler. The scheduler may operate, for example, as a computer including a processor, executing computer program instructions stored in a non-transitory computer-readable medium. More particularly, the computer may be configured by the executing instructions to carry out the adaptive PIF scheduler process. The Adaptive PIF block 602 uses information provided from an RTT Estimation Feedback block 604 to adjust the PIF. A rate limiter block 605 may be employed to limit the rate of packet request and/or response traffic over the network. For example, one or more of a packet rate limiter block 606, a request byte rate limiter block 608 and a response byte rate limiter block 609 may be utilized to moderate the rate of packet transmission.

The packet rate limiter block 606 may be utilized to enforce packet rate limiting, while the request byte rate limiter block 608 and/or response byte rate limiter block 609 may be used to enforce byte rate limiting. With respect to rate limiting, in some examples, a byte rate limiter alone may not prevent the packet rate from exceeding a desired rate, such as for small request and/or response packets. Furthermore, a packet rate limiter alone may not prevent the byte rate from exceeding a desired rate, such as for large request and/or response packets. Therefore, while use of either a packet rate limiter or one or more byte rate limiters may be adequate (and, in fact, use of neither may be entirely adequate), it can be desirable to utilize both a packet rate limiter and one or more byte rate limiters in order to operate in a desired manner under a wider range of packet size conditions.

We now particularly discuss the concept of adapting or adjusting the PIF based on round trip time (RTT). Roundtrip time may be considered an indication of the latency between the time a packet is sent from a node of a sending network and the time a response to that packet is received from a node of a receiving network. Again, PIF is the limit on the number of unacknowledged packets in flight; TO is the timeout; and TR is the peak aggregate throughput capacity of the internetwork.

Assuming an infinite gateway buffer, no packet loss, and constant RTT for all nodes behind a gateway, the effective packet throughput (R) may be determined as:

$$R = \begin{cases} \min(TR, PIF/RTT) & RTT < TO \\ 0 & RTT \geq TO \end{cases} = \begin{cases} TR & RTT \leq PIF/TR \\ PIF/RTT & PIF/TR < RTT < TO \\ 0 & RTT \geq TO \end{cases}$$

According to this formulation, within the RTT window, a PIF scheduler should not allow more than PIF number of packets to be sent. Furthermore, the packet throughput is bounded by the peak aggregate capacity of the inter-network TR. It is concluded from this formulation, then, that the maximum throughput allowable by the inter-network can be achieved so long as RTT≦PIF/TR. Put another way, as long as PIF≧RTT*TR, maximum throughput of TR can theoretically be achieved. In some examples, PIF may be chosen to be the smallest possible value: PIF=RTT*TR. A reason for selecting the smallest possible value may be to minimize traffic burstiness that may otherwise be allowed by higher values of PIF. RTT can be measured for each packet and, furthermore, a smoothing function such as a moving average function may be applied to determine an RTT statistic. In one example, an exponentially weighted moving average function is employed.

It can thus be seen that the maximum PIF may be dynamically adjusted with only a priori knowledge or estimate of peak capacity of the inter-network to achieve maximum throughput allowable by the inter-network, even when inter-network capacity at any particular time is not a priori known. That is, from the above formulation, it can be seen that so long as PIF≧RTT*TR, a maximum throughput TR can be achieved, where TR is the peak capacity of the inter-network and is typically known a priori or can be reliably estimated (or, in some cases, may be initially determined such as, for example, by experimentation). RTT can be determined dynamically.

The relationship of PIF≧RTT*TR holds for any value of TR≧0. Let TI denote the maximum throughput available in the inter-network at any instant. TI is always smaller than or equal to TR. Without loss of generality, TR can be replaced with TI in the above formulation. The dynamic value of PIF chosen as formulated above is PIF=RTT*TR. Since TR≧TI, PIF=RTT*TR≧RTT*TI. Hence, a dynamically determined PIF is large enough such that the maximum instantaneous throughput TI can be achieved.

In other words, the adaptive PIF determination in some examples need only know the inter-network's peak capacity in order to allow packets to be sent as fast as the inter-network can handle, even though what the inter-network can handle at any particular instant is never explicitly communicated to the PIF determination. For example, in one inter-network, peak capacity for a typical access point may be seven packets per second, whereas the actual capacity depending on current inter-network conditions may vary from between one packet per second to seven packets per second. The PIF determination does not know the actual capacity but, rather, is able to adapt such that the sending of packets is either slowed down or speeded up to match the actual capacity allowed by the inter-network. The peak capacity is the only a priori input to the adaptive PIF determination.

As mentioned above, without placing some limit on the rate of packet transmission other than as regulated by the PIF counter, in some situations, the packet transmission may be bursty such that, even though the inter-network as a whole may be considered to be able to handle the traffic according to the PIF counter, particular components may not be able to handle the traffic and packets may thus be lost. Also, if the packet transmission rate is limited only by the PIF, packet transmission may attempt to use all the available bandwidth of the inter-network, and some bandwidth desired or required for other applications may not be available. Thus, for example, the throughput may be considered in some examples to be the minimum of the following three values: 1) maximum throughput allowable by the inter-network at a given instant; 2) peak capacity TR; and 3) rates as governed by rate limiters.

The packet rate limiter block 606 may, for example, use a well-known token bucket scheme wherein tokens are added to a packet rate bucket at a constant rate and, as packets are sent, tokens are removed from the packet rate bucket. If there are not enough tokens in the packet rate bucket at a particular time a packet is ready to be sent, then the packet cannot be sent at that time. According to an example of a token bucket algorithm, a token is added to the bucket every 1/r seconds. The bucket can hold at most "b" tokens and, if a token arrives when the bucket is full, the arriving token is discarded. The parameters "r" and "b" as well as other parameters are configurable and may be configured, for example, heuristically, based on observation of past inter-network behavior, may be configured dynamically to optimize inter-network behavior (such as to optimize packet transmission rate while at the same time minimizing packet loss) or may even be configured to optimize packet transmission bandwidth usage to allow inter-network bandwidth to be used by other applications.

In some examples, one or both of the request byte rate limiter block 608 and a response byte rate limiter block 609 may be utilized. That is, in addition to or instead of regulating transmission on a packet basis, transmission may also or instead be regulated on a data volume (typically byte) basis. For example, the request byte rate limiter block 608 may utilize a token bucket to regulate, on a byte basis, the rate of transmission of requests from a node of a source network via a particular gateway. The response byte rate limiter block 609 may utilize a token bucket to regulate, on a byte basis, the rate of transmission of responses back to the source node. In many communication networks, especially wireless networks, request and response share the same physical channels and can interfere with each other. Hence, controlling the response rate can be critical to congestion control. If rate limiting is only applied to the requests and response is ignored, in a typical system where request size is generally smaller than the response size, the rate limiter may allow requests to be sent too fast, resulting in a flood of large responses that will congest the network. A response size is measured after receiving the response, and the measured response size is indirectly used to regulate transmission of responses back to the source node, as a regulation of request transmission. While such regulation is, in some sense, "after the fact," it is believed that in many situations, the size of already received responses has a good correlation to the size of responses to to-be-sent requests. This can be particularly so when similar types requests are being sent in close temporal proximity to each other and it is expected that the size of the responses to these similar types of requests will be relatively similar in size.

With respect to packet rate limiting, when a packet is to be transmitted, the packet rate token bucket is checked. If there is no token available in the bucket, then the packet cannot be sent at that time. With respect to request byte rate limiting, there must be a token in the respective byte rate token bucket for each byte (or predetermined number of bytes) in order to send the packet. This is relatively straightforward for packet rate limiting and request byte rate limiting. With respect to response byte rate limiting, in one example, a check is made to ensure that the actual response rate does not exceed a particular desired response rate, at least for what is deemed to be a reasonable amount of time. Thus, in one example, so long as the number of response rate tokens stays within a particular range, this means that the response rate is also staying within a range. If the number of response rate tokens dips below some threshold, then the response rate is slowed by refraining from sending out new requests until the response rate token bucket fills again to some desired level.

In one example, a desired response byte rate is 1000 bytes per second. In this case, 1000 response byte rate tokens would be added to the response byte rate bucket every second. In the example, at any time the number of response byte rate tokens falls below 0, no more requests would be sent until the number of response byte rate tokens is refreshed to an acceptable level. In the example, the maximum number of response byte rate tokens held by the bucket is 3000. Without a cap, the number of response byte rate tokens can get very large after long periods of inactivity, which may then allow an undesirable burst of activity. In the example, the minimum number of response byte rate tokens is set to −1000. Without setting a floor, the number of response byte rate tokens may take too long a time to recover, such that packets may not be sent for too long after periods of high response byte rate. In the example where 1000 response byte rate tokens are added to the response byte rate bucket every second, the 1000 response byte token cushion provides a 1 second grace period after a high response byte rate, with no further request packets being sent, for the inter-network to recover.

Figure 7A:
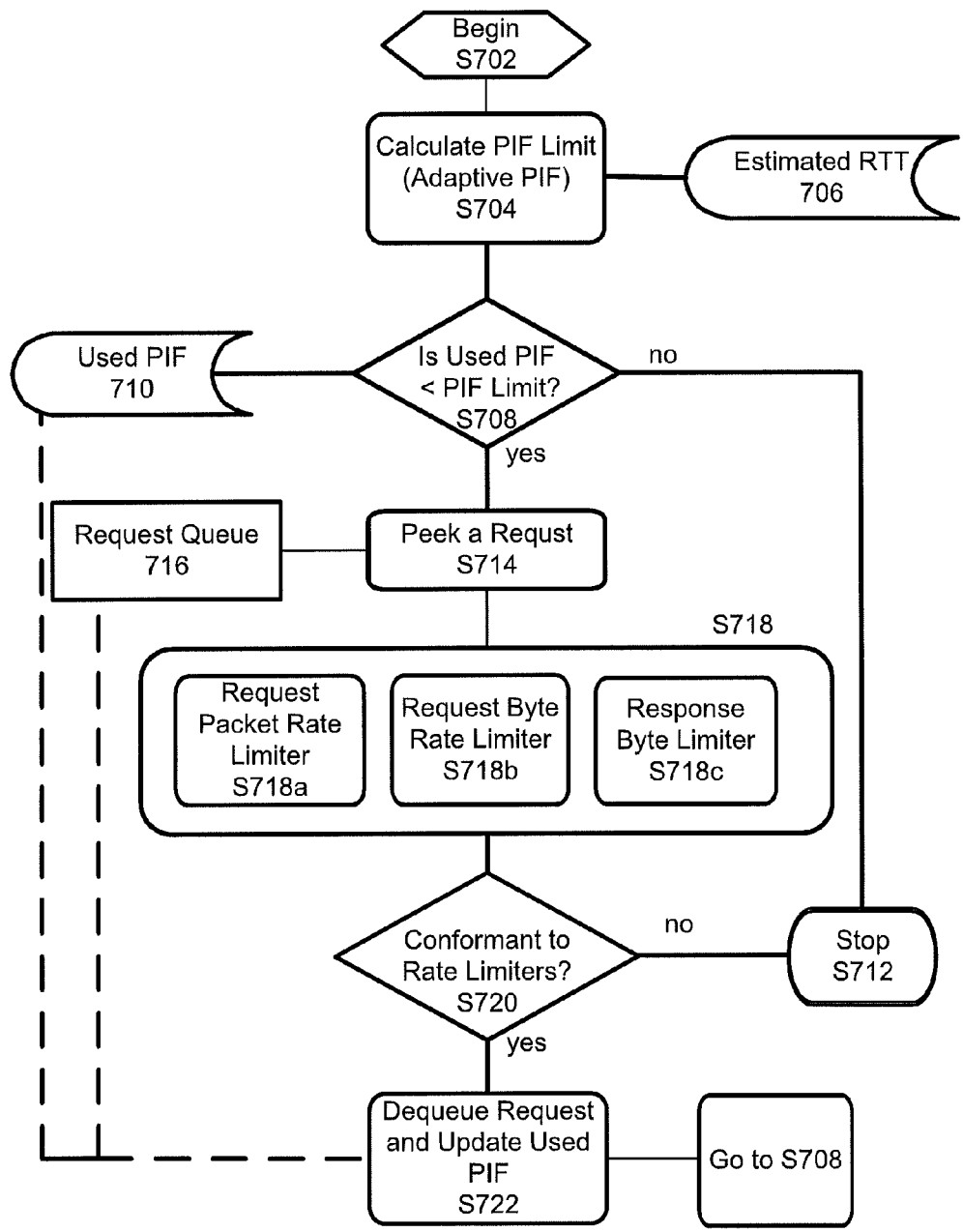
FIG. 7a is a flowchart illustrating an example of a "request retrieval" process.
Figure 7:
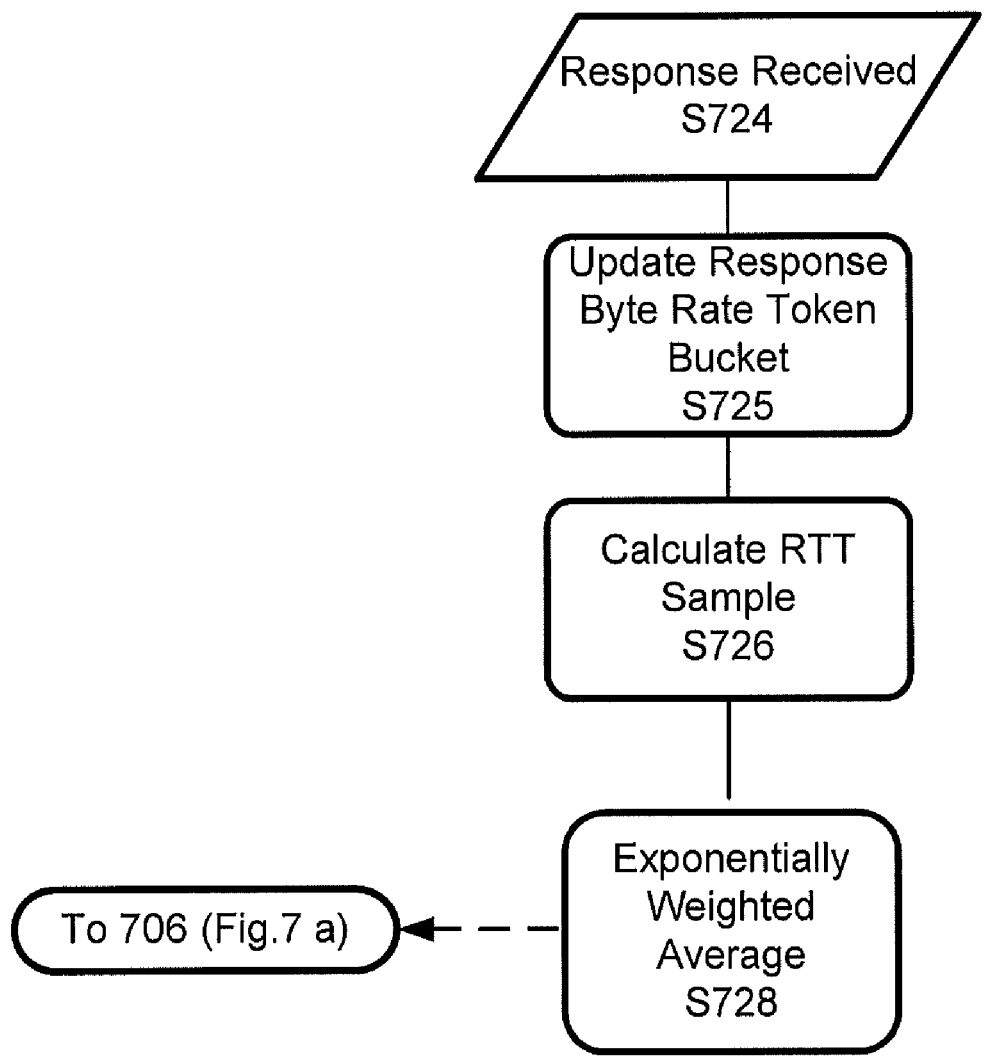
FIG. 7b is a flowchart illustrating an example of an asynchronously occurring "response arrival" process.

The above discussion is now summarized with reference to the flowchart illustrated in FIGS. 7a and 7b. Referring to FIGS. 7a and 7b, FIG. 7a illustrates an example of the "request retrieval" process. On the other hand, FIG. 7b illustrates an example of an asynchronously occurring "response arrival" process.

The FIG. 7a process begins at S702. At S704, the PIF limit is calculated, using the estimated round trip time (RTT) value 706: PIF=RTT*TR, where TR is the peak capacity of the network.

At S708, the actual "Used PIF" counter 710, indicative of the number of packets in flight, is compared to the calculated PIF limit. If the PIF counter is not less than the PIF limit, then no packets are to be sent at this time, and processing stops at S712. If the PIF counter is less than the PIF limit, then a packet may be sent subject to, in the FIG. 7a example, one or more rate limiter checks.

The rate limiter checks are within S5718, S718a, S718b and S718c, to determine whether a packet in packet request queue 716 may be transmitted. At S714, a request in the request transmission queue 716 is "peeked"—i.e., inspected without yet removing it for transmission. At S718, various rate limiter checks are carried out. Specifically, at S718a, it is determined whether transmitting the peeked packet would violate a packet rate limit restriction. At S718b, it is determined whether transmitting the peeked packet would violate a request byte rate limit restriction. Finally, at S718c, it is determined whether the response byte rate is exceeding a desired response byte rate.

At S720, it is determined if all the rate limiter conditions have been met. If so, then at S722, the peeked request packet is dequeued from the request queue 716 and caused to be transmitted, and the used PIF counter 710 is updated accordingly. In addition, the request packet rate token bucket and request byte rate token bucket (not shown) are also updated accordingly.

Referring to FIG. 7b, which is an example of the response arrival process, at S724, a response is received. At S725, the response byte rate token bucket is updated. At S726, the round trip time (RTT) for the response is calculated, based on a difference between the time of receiving the response and the earlier time at which the corresponding request was sent. At S728, a RTT statistic is calculated (in FIG. 7b, an exponentially weighted average). The RTT statistic is saved to the new Estimated RTT 706 (FIG. 7a).

The exemplary systems and method described above provide several advantages over conventional congestion control and/or avoidance techniques. In particular, the exemplary system and methods for monitoring packets-in-flight in an inter-network as described herein, on the other hand, need not be implemented by the gateways, but rather may be implemented by a non-gateway Sending Node or by one or more other nodes of the sending network. Moreover, the above-described system and methods bases a decision to send packets to a network on the capacity of the inter-network in aggregate, rather than the capacity of a single node of the inter-network in isolation.

As described above, in accordance with some specific examples, a steady throughput may be maintained at a desired threshold in a highly dynamic environment with variable roundtrip time. As also described above, typically, roundtrip time variability is attributed to the type of request and other conditions of the inter-network. Using adaptive congestion control, packet transmission rate can be quickly adapted to speed up or slow down depending on inter-network condition. In some aspects, the packet transmission can be configured to use only up to the specified amount of bandwidth, such as by using independent byte- and packet-based bandwidth "knobs." Control may be of both in-bound and out-bound throughput. Optimal inter-network throughput may be achieved and maintained without prior knowledge of inter-network conditions. Even when the throughput varies due to changing inter-network conditions, the scheduler can determine a rate of request packet transmission the inter-network can handle at any point in time. A feedback system is used to continuously control throughput based on one or both of roundtrip time and request/response size.

The systems and methods described herein can be implemented through software code that is encoded, recorded, or stored on a computer readable medium. The computer readable medium can be used in configuring each sending node, which is connected to an internetwork as described above. One of ordinary skill in the art will appreciate that the computer readable medium can include an optical disk, floppy disk, flash memory, magnetic tape, or any tangible storage device or medium as desired.

The congestion control system and methods described here can accommodate an arbitrary number of networks and internetworks, an arbitrary number of request packets, and an arbitrary number of nodes in each network.

While the invention has been described with reference to specific embodiments, this description is merely representative of the invention and is not to be construed to limiting the invention. For example, the specific embodiments may operate in a wide variety of apparatuses, such as computer apparatuses such as one or more computers each including one or more processors executing computer program instructions to accomplish the described methods or, in part or in whole, hardwired to accomplish the described methods. The computer program instructions may be stored in one or more computer readable media such as magnetic or optical disc media, memory or any other tangible computer readable media. Furthermore, various modifications and applications may occur to those skilled in the art without departing from the true spirit and scope of the invention as defined by the appending claims.

What is claimed is:

1. A method of congestion control in an internetwork having a first network and plural second networks, the method comprising:
    establishing a respective packet-in-flight counter for each one of the plural second networks and a respective maximum packet-in-flight indication for each one of the plural second networks;
    adjusting the respective packet-in-flight counter for each one of the plural second networks when a request packet is sent from any node in the first network to any node in that one of the plural second networks;
    adjusting the respective packet-in-flight counter of each one of the plural second networks to which a request packet is sent when a response packet is received from any node in that one of the plural second networks;
    determining whether a second request packet can be sent from any node in the first network to any of the plurality of nodes in one of the plural second networks, based on processing a value of the respective packet-in-flight counter for that one of the plural second networks and a value of the respective maximum packet-in-flight indication for that one of the plural second networks; and
    adjusting the respective maximum packet-in-flight indication for each one of the plural second networks based on a statistic that is indicative of roundtrip time for request packets sent from any node of the first network to any of the plurality of nodes in that one of the plural second networks.

2. The method of claim 1, wherein:
    adjusting the respective maximum packet-in-flight indication for each one of the plural second networks is not based on information that explicitly represents instantaneous capacity of the first network, that one of the plural second networks or a gateway interconnecting the first network to that one of the plural second networks.

3. The method of claim 1, further comprising:
    determining the statistic that is indicative of roundtrip time for request packets sent from any node of the first network to any of the plurality of nodes in that one of the plural second networks.

4. The method of claim 1, further comprising:
    determining the roundtrip time for request packets sent from any node of the first network to any of the plurality of nodes in each one of the plural second networks by determining a difference in time between sending a request packet from said any node of the first network and receiving a corresponding response packet from said any of the plurality of nodes in that one of the plural second networks.

5. The method of claim 1, further comprising:
    determining the statistic that is indicative of roundtrip time for request packets sent from any node of the first network includes determining a weighted average of the roundtrip time for at least some of the request packets sent from the node of the first network.

6. The method of claim 5, wherein:
    the weighted average is an exponentially weighted average.

7. The method of claim 1, wherein:
    determining whether a second request packet can be sent from any node in the first network to any node in one of the plural second networks is further based on processing at least one value indicative of a respective rate of transmitting information from any node in the first network to any node in the one of the plural second networks.

8. The method of claim 7, wherein:
    the at least one value indicative of a respective rate of transmitting information from any node in the first network to any node in the one of the plural second networks includes a respective request packet transmission rate value for request packets sent from any node in the first network to any node in the one of the plural second networks.

9. The method of claim 8, wherein:
    the respective request packet transmission rate value corresponds to a respective number of tokens in a request packet transmission rate bucket for the one of the plural second networks.

10. The method of claim 7, wherein:
    the at least one value indicative of a respective rate of transmitting information from any node in the first network to any node in the one of the plural second networks includes a respective request packet byte transmission rate value for request packets sent from any node in the first network to any node in the one of the plural second networks.

11. The method of claim 10, wherein:
    the respective request packet byte transmission rate value corresponds to a number of tokens in a request packet byte transmission rate bucket for request packets received by any node of the first network from any node of the one of the plural second networks.

12. The method of claim 7, wherein:
    the at least one value indicative of a respective rate of transmitting information from any node in the first network to any node in the one of the plural second networks includes a response packet byte transmission rate value.

13. The method of claim 12, wherein:
    the respective response packet byte transmission rate value corresponds to a number of tokens in a response packet byte transmission rate bucket for response packets received by any node of the first network from any node of the one of the plural second networks.

14. A node in an internetwork having a first network and plural second networks, the node being a node in the first network and configured to:

establish a respective packet-in-flight counter for each one of the plural second networks and a respective maximum packet-in-flight indication for each one of the plural second networks;

adjust the respective packet-in-flight counter for each one of the plural second networks when a request packet is sent from the node in the first network to any node in that one of the plural second networks;

adjust the respective packet-in-flight counter of each one of the plural second networks to which a request packet is sent when a response packet is received from any node in that one of the plural second networks;

determine whether a second request packet can be sent from the node in the first network to any of the plurality of nodes in one of the plural second networks, based on processing a value of the respective packet-in-flight counter for that one of the plural second networks and a value of the respective maximum packet-in-flight indication for that one of the plural second networks; and adjust the respective maximum packet-in-flight indication for each one of the plural second networks based on a statistic that is indicative of roundtrip time for request packets sent from the node of the first network to any of the plurality of nodes in that one of the plural second networks.

15. The node of claim 14, wherein:

adjusting the respective maximum packet-in-flight indication for each one of the plural second networks is not based on information that explicitly represents instantaneous capacity of the first network, that one of the plural second networks or a gateway interconnecting the first network to that one of the plural second networks.

16. The node of claim 14, further configured to:

determine the statistic that is indicative of roundtrip time for request packets sent from the node of the first network to any of the plurality of nodes in that one of the plural second networks.

17. The node of claim 14, further configured to:

determine the roundtrip time for request packets sent from the node of the first network to any of the plurality of nodes in each one of the plural second networks by determining a difference in time between sending a request packet from said node of the first network and receiving a corresponding response packet from said any of the plurality of nodes in that one of the plural second networks.

18. The node of claim 14, wherein:

determining the statistic that is indicative of roundtrip time for request packets sent from the node of the first network includes determining a weighted average of the roundtrip time for at least some of the request packets sent from the node of the first network.

19. The node of claim 18, wherein:

the weighted average is an exponentially weighted average.

20. The node of claim 14, wherein:

determining whether a second request packet can be sent from the node in the first network to any node in one of the plural second networks is further based on processing at least one value indicative of a respective rate of transmitting information from the node in the first network to any node in the one of the plural second networks.

21. The node of claim 20, wherein:

the at least one value indicative of a respective rate of transmitting information from the node in the first network to any node in the one of the plural second networks includes a respective request packet transmission rate value for request packets sent from the node in the first network to any node in the one of the plural second networks.

22. The node of claim 21, wherein:

the request packet transmission rate value corresponds to a number of tokens in a request packet transmission rate bucket.

23. The node of claim 20, wherein:

the at least one value indicative of a respective rate of transmitting information from the node in the first network to any node in the one of the plural second networks includes a respective request packet byte transmission rate value for request packets sent from the node in the first network to any node in the one of the plural second networks.

24. The node of claim 23, wherein:

the respective request packet byte transmission rate value corresponds to a number of tokens in a request packet byte transmission rate bucket for request packets received by the node of the first network from any node of the one of the plural second networks.

25. The node of claim 20, wherein:

the at least one value indicative of a respective rate of transmitting information from the node in the first network to any node in the one of the plural second networks includes a response packet byte transmission rate value.

26. The node of claim 23, wherein:

the respective response packet byte transmission rate value corresponds to a number of tokens in a response packet byte transmission rate bucket for response packets received by any node of the first network from any node of the one of the plural second networks.

* * * * *